United States Patent [19]

Pyke et al.

[11] Patent Number: 4,574,039

[45] Date of Patent: Mar. 4, 1986

[54] PHOTOCORROSION RESISTANT SEMICONDUCTOR PHOTOELECTRODES

[75] Inventors: Stephen C. Pyke, Willowick; Mark R. Bruce, Berea, both of Ohio

[73] Assignee: The Standard Oil Company (Ohio), Cleveland, Ohio

[21] Appl. No.: 653,415

[22] Filed: Sep. 24, 1984

[51] Int. Cl.[4] .............................................. C25B 11/04
[52] U.S. Cl. .................................. 204/290 R; 427/74; 427/85; 429/111
[58] Field of Search ................... 204/290 R; 429/111; 427/74, 85

[56] References Cited

U.S. PATENT DOCUMENTS 4,492,743  1/1985  Howe ................................... 429/111
4,501,804  2/1985  Bockris et al. ...................... 429/111

Primary Examiner—Aaron Weisstuch
Attorney, Agent, or Firm—Jeffrey A. Wyand; Joseph G. Curatolo; Larry W. Evans

[57] ABSTRACT

A semiconductor photoelectrode resistant to photocorrosion and a method of preparing such a photoelectrode are disclosed. The photoelectrode includes a doped oxide layer on which illumination falls for photo-stimulation. The oxide layer is doped with metallic ions, such as tantalum ions, to suppress photocorrosion. In one oxide doping method, tantalum pentachloride vapor generated by sublimation is directed against a silicon dioxide layer on a heated photoelectrode.

10 Claims, 4 Drawing Figures

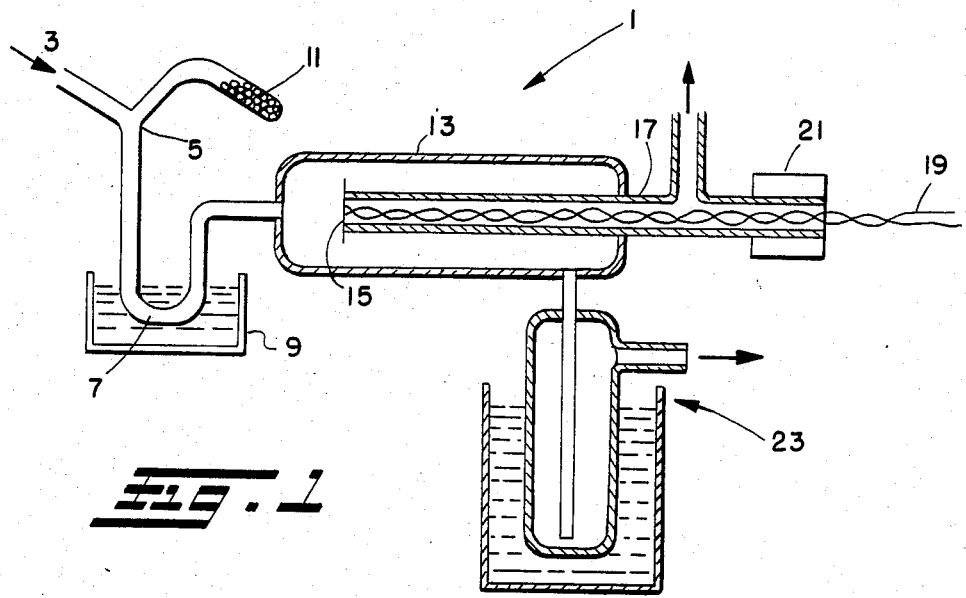
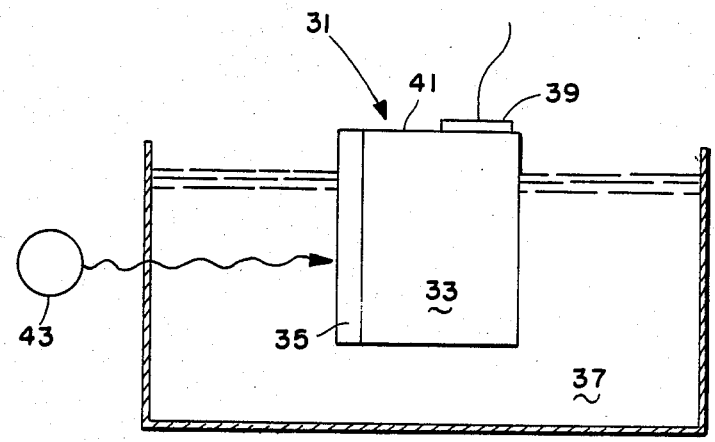

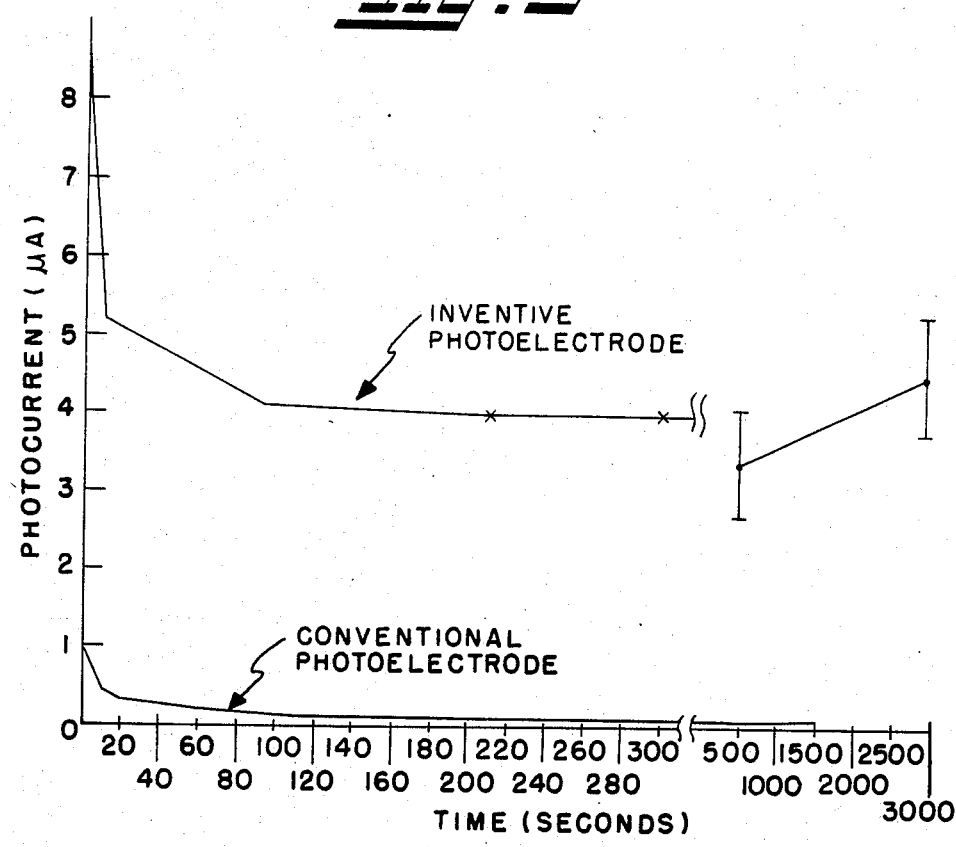
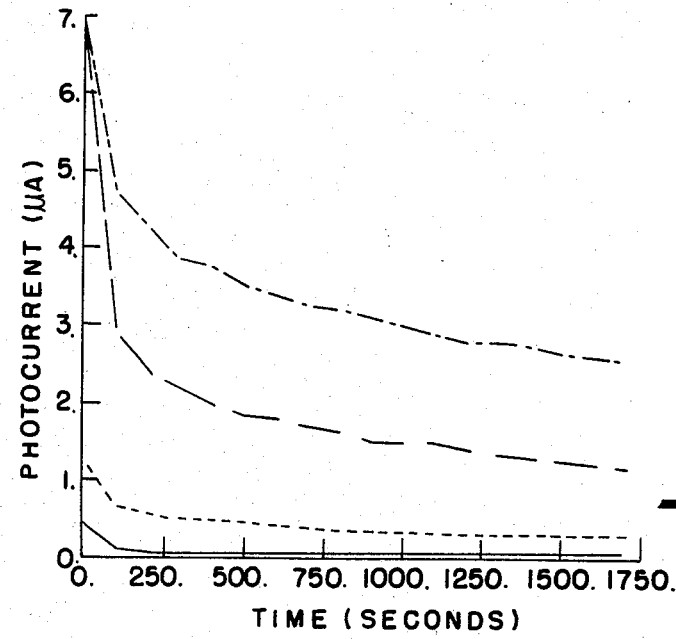

PHOTOCORROSION RESISTANT SEMICONDUCTOR PHOTOELECTRODES

BACKGROUND

Semiconductor photoelectrodes used in liquid electrolytes are known. These photoelectrodes can be prepared from various elemental and compound semiconductors, such as silicon and indium phosphide. The photoelectrode is immersed in an electrolyte and a photovoltage is produced when light falls on the photoelectrode.

The electrolyte contributes to the deterioration of photoelectrode performance over time. The deterioration is particularly prevalent with photoelectrodes formed from a semiconducting material, such as silicon, that naturally forms an oxide layer. It is believed that current flow in n-type silicon photoelectrodes stimulates oxide growth when holes recombine at the oxide-electrolyte interface. The increased oxide thickness adds resistance to the electrode circuit resulting in performance deterioration. The same result will occur with photoelectrodes prepared from other semiconducting materials on which an oxide layer naturally forms or upon which a transparent oxide is deposited for protective or optical purposes.

SUMMARY OF THE INVENTION

In the invention, electrode deterioration from photocorrosion is suppressed by doping the oxide layer that receives the stimulating illumination. The preferred dopants comprise metal ions. The metal ions may be tantalum, vanadium, titanium, or niobium. In a preferred application of the invention, the doping is achieved by depositing metal ions directly on the oxide. The deposition may be carried out by heating the photoelectrode and directing a vapor bearing the dopant ions against the oxide layer. For example, tantalum pentachloride may be sublimed and the vapor directed at a silicon dioxide layer on a silicon photoelectrode heated to between about 340° C. to 385° C.

Silicon photoelectrodes prepared according to the invention show improvements in photocurrents both initially and as the electrode ages. Aged silicon electrodes according to the invention showed photocurrents about 450 times larger than similar photoelectrodes having no doping of the oxide layer.

BRIEF DESCRIPTION OF THE DRAWINGS

FIG. 1 schematically depicts an apparatus in which photoelectrodes according to the invention may be prepared.

FIG. 2 shows in cross section a semiconductor photoelectrode, according to the invention, immersed in an electrolyte.

FIG. 3 is a graph of the photoresponse over time of a photoelectrode according to the invention and another photoelectrode.

FIG. 4 is another graph of the photoresponse over time of several photoelectrodes according to the invention and another photoelectrode.

DETAILED DESCRIPTION OF PREFERRED EMBODIMENTS

In FIG. 1, an apparatus 1 for doping an oxide layer on a semiconductor photoelectrode is shown schematically. The apparatus is conveniently prepared from glass or quartz. A carrier gas, such as argon, may be introduced through an inlet 3. Tubing leads from inlet 3 past a y-connection 5 to a u-shaped elbow 7 which is immersed in an oil bath 9 that may be heated and maintained at a constant temperature. A reservoir 11 contains a supply of a solid, sublimable source material, such as tantalum pentachloride, capable of producing metal ions in a vapor for doping. Reservoir 11 may be tipped to admit the solid source material into y-connection 5 and therethrough to elbow 7. The temperature of oil bath 9 is adjusted to sublime the source material in elbow 7. That vapor, borne by the carrier gas, is transported via tubing into a reaction chamber 13.

A semiconductor body 15 is held in reaction chamber 13 against one end of an open tube 17 by the application of a vacuum at another opening in tube 17. Reaction chamber 13 is placed in an oven (not shown) and a thermocouple 19 in tube 17 touching semiconductor body 15 is used to monitor the temperature of the semiconductor body. Thermocouple 19 exits a port in tube 17 via an air tight connector 21. Semiconductor body 15 has an oxide layer on at least one surface and that surface is mounted to receive the gas flowing into reaction chamber 13. Preferably semiconductor body 15 is mounted approximately normal to the gas flow. Reaction chamber 13 is exhausted through a conventional cold trap 23. Typically, cold trap 23 is operated at liquid nitrogen temperature to condense any of the gas formed by sublimation that is not consumed in the reaction chamber.

In a variation of the doping process, the use of a carrier gas is avoided. In lieu of a carrier gas, inlet 3 may be sealed and a vacuum applied to the exhaust of cold trap 23 to draw the sublimation products into and through reaction chamber 13. This method has the advantage that apparatus 1 is closed and potential contaminants from the carrier gas are excluded.

In the apparatus just described, metal ions are deposited on the oxide layer of body 15 in sufficient quantity to dope the oxide, but not in sufficient quantity to form a conducting sheet or electrical contact on the oxide. Some of the metallic atoms may remain on the surface of the oxide while others diffuse into it. While in the example described in detail tantalum ions are used as a dopant, other metallic dopants that may be used include vanadium, titanium, and niobium. Those dopants may be supplied in gaseous form using the technique and apparatus just described or another gaseous source. The oxide layer may also be doped with metal ions by alternative techniques to produce the inventive photoelectrode.

The process described is particularly useful when semiconductor body 15 is silicon upon which an oxide layer readily forms. However, many other semiconductor materials, such as indium phosphide, germanium, amorphous silicon, cadmium sulfide, and cadmium telluride may be used for photoelectrodes. The process may be used to dope oxide or insulating layers that form on these and other materials naturally or that may be deposited on them for protective or optical purposes.

A semiconductor photoelectrode 31 according to the invention is shown in cross section in FIG. 2. The photoelectrode includes a semiconductor body 33 having an oxide layer 35 on one surface. The oxide layer is in contact with an aqueous electrolyte 37. An electrical contact 39 is disposed on surface 41 of photoelectrode 31 that is above the surface of the electrolyte. Contact 39 may be connected to electrical circuitry, not shown, for measurement and use of the photovoltage and photo-current generated. A second electrode, not shown, may also be immersed in electrolyte 37 as part of the circuitry. A source of light 43 produces illumination that falls on electrode 31 through oxide layer 35.

We prepared doped oxide photoelectrodes according to the invention using silicon wafers. One surface of each wafer was polished for receiving illumination. An oxide naturally formed on that surface. The silicon wafers were degreased and placed in the apparatus of FIG. 1. Metal atoms were then deposited on the polished, oxidized surface. The dopant source was tantalum pentachloride and oil bath 9 was maintained at 180° C. to 190° C. Reaction chamber 19 was maintained at 340° C. to 385° C. and cold trap 23 was operated at liquid nitrogen temperature.

In some cases, argon was flowed through the apparatus as a carrier gas at 10 ml/min. In other cases, inlet 3 was sealed and a vacuum applied to the outlet of cold trap 23. In the former case, 7 grams of tantalum pentachloride was deposited into elbow 7 over a 30 minute period to produce gaseous tantalum atoms continuously over that time.

Gold contacts were deposited on an unpolished surface of the electrode. A gold wire was cemented to the contact with conductive epoxy. The electrode was mounted in an acrylic holder.

A doped oxide layer on a silicon photoelectrode prepared in the apparatus described using argon as a carrier gas was exposed to a solution of 300 mM ferric and 50 mM ferrous ion in 1M HCl. With reference to a platinum electrode, the rest potential was −0.3 V. To establish the rectifying properties of the electrode, its potential was adjusted at 50 mV/sec toward the positive potential until the dark anodic current flow increased. Then the voltage scan was reversed until the cathodic current began to increase. The voltage sweep was repeated with the light output of a 9 mW helium/neon laser trained on the photoelectrode. The doped oxide photoelectrode produced a photocurrent of about 4 µA at 75 mV. By contrast, the photocurrent produced by a photoelectrode without a doped oxide layer remained less than 1 µA for voltages up to 350 mV.

A photoelectrode according to the invention and a photoelectrode with an undoped oxide layer were each placed in separate electrolytes with a reference electrode, biased with a fixed potential, illuminated with the helium/neon laser and the photocurrent generated monitored over time. The measured results are shown in FIG. 3. The higher current plot is for the inventive photoelectrode, the lower plot is for the conventional photoelectrode. To show longer term results, the results are omitted for intermediate times. The inventive photoelectrode was biased at 75 mV and the photoelectrode with an undoped oxide layer was maintained at 350 mV. The inventive photoelectrode had an initial photocurrent 65 times greater than the conventional photoelectrode and the relative photocurrent decay over time was much smaller for the inventive sample. The photocurrent in the photoelectrode according to the invention eventually fell to 47% of the initial value, while in the conventional photoelectrode the photocurrent eventually fell to 6.6% of the initial value.

Additional measured results are shown in FIG. 4 for other silicon photoelectrodes prepared according to the invention as well as for a conventional silicon photoelectrode. The photocurrent generated over time by the conventional photoelectrode is the lowest curve. The next highest response plotted in FIG. 4 was measured with a tantalum doped oxide that was produced with apparatus 1 operating at 350° C. with argon as a carrier gas. The most responsive photoelectrodes, the highest two plots of FIG. 4, were produced when apparatus 1 was sealed, i.e. no carrier gas was used, and the oxide layer was doped for two hours at 385° C.

The invention has been described with respect to certain preferred embodiments. Various modifications and additions within the scope of the invention will occur to one of skill in the art. Accordingly, the scope of the invention is limited solely by the following claims.

We claim:

1. A semiconductor photoelectrode resistant to photocorrosion, said photoelectrode comprising a semiconductor body having at least one outside surface and a silicon dioxide layer on said at least one outside surface of said body for receiving illumination, wherein said silicon dioxide layer is doped with metal atoms of at least one of the group of tantalum, vanadium, titanium, and niobium.

2. The photoelectrode of claim 1 where said semiconductor body is composed of substantially pure silicon.

3. The photoelectrode of claim 1 further including an electrical contact disposed on said semiconductor body.

4. A process for improving the photocorrosion resistance characteristics of a semiconductor photoelectrode for use in an aqueous electrolyte, said photoelectrode having a silicon dioxide outer layer, said process comprising elevating the temperature of said photoelectrode and depositing atoms of at least one metal of the group of tantalum, vanadium, titanium, and niobium on said silicon dioxide layer of said photoelectrode while the temperature is elevated to dope said silicon dioxide layer with metal ions of said at least one metal.

5. The process of claim 4 wherein said photoelectrode is composed of silicon.

6. The process of claim 4 wherein the temperature of said photoelectrode is elevated to between approximately 340° and 385° C.

7. The process of claim 4 wherein said metal ions are tantalum atoms and further including subliming tantalum pentachloride to form a vapor and directing said vapor against said oxide layer to deposit tantalum atoms on said oxide layer.

8. The process of claim 7 wherein the temperature of said photoelectrode is elevated to between approximately 340° and 385° C.

9. The process of claim 7 further including transporting said gas toward said oxide layer with a carrier gas.

10. The process of claim 9 wherein said carrier gas is argon.

* * * * *